United States Patent [19]

Jervis

[11] Patent Number: 4,859,809
[45] Date of Patent: Aug. 22, 1989

[54] SPLICE CASE

[75] Inventor: James E. Jervis, Atherton, Calif.

[73] Assignee: Raychem Corporation, Menlo Park, Calif.

[21] Appl. No.: 186,533

[22] Filed: Apr. 27, 1988

[51] Int. Cl.⁴ .......................................... H02G 15/113
[52] U.S. Cl. .......................................... 174/92; 174/76
[58] Field of Search .................................... 174/92, 76

[56] References Cited

U.S. PATENT DOCUMENTS

| | | | |
|---|---|---|---|
| 3,147,338. | 9/1964 | Ekvall et al. | 174/92 |
| 3,678,175 | 7/1972 | Appiani et al. | 174/92 |
| 3,757,031 | 9/1973 | Izraeli | 174/138 F |
| 3,971,894 | 7/1976 | Faust et al. | 174/92 X |
| 4,451,696 | 5/1984 | Beinhaur | 174/92 |
| 4,610,738 | 9/1986 | Jervis | 174/92 X |
| 4,634,207 | 1/1987 | Debbaut | 174/76 X |
| 4,692,564 | 9/1987 | Campbell et al. | 174/92 |
| 4,716,183 | 12/1987 | Gamarra et al. | 524/490 X |
| 4,736,071 | 4/1988 | Hawkins et al. | 174/92 |

*Primary Examiner*—Morris H. Nimmo
*Attorney, Agent, or Firm*—A. Stephen Zavell; Herbert G. Burkard

[57] ABSTRACT

A splice case for a telecommunications cable splice comprises first and second parts that are held together by springs that function also to deform surfaces of the parts to put a sealing material therein under compression. The splice case may contain a conductor organizer.

11 Claims, 6 Drawing Sheets

FIG_1

FIG_2

FIG_3

FIG_4

FIG_5  FIG_6

FIG_7

SPLICE CASE

TECHNICAL FIELD

The present invention relates to a splice case for encapsulating conductors, particularly in a telephone system, and is especially suitable for buried or other outdoor use.

BACKGROUND OF THE INVENTION

It is frequently necessary to protect conductor splices from the environment in order that they may continue to function properly for a life-time that may extend to several tens of years. Thus, the splice may be encapsulated by some means, preferably in a fashion that allows easy access to the splice (known as re-entry) for repair or rearrangement of conductors without destroying the original encapsulation.

Various techniques have been used in the past, including the formation of a container around the splice and pouring therein a curable resin, the use of heat-shrinkable articles, and the use of simple mechanical closures. The first of these techniques can produce a good seal but is difficult to carry out, and the seal is not re-enterable, and the third seal may be easily re-enterable but is poor. Heat-shrinkable articles, particularly in conjunction with hot-melt adhesives, produce excellent seals and can be reentered, although some of the original article will generally be lost, but will not generally be chosen where repeated re-entry may be required.

U.S. Pat. No. 4,610,738 (Jervis), the disclosure of which is incorporated herein by reference, relates to a splice case suitable for sealing connections between a small pair count telecommunications cable, and a plurality of drop wires. It may also seal connections between dropwires themselves.

That splice case comprises:
- at least one gel having a cone penetration value from approximately 100 to 350 ($10^{-1}$ mm) and an ultimate elongation of at least approximately 200%;
- first and second open containers for containing said gel, an exposed first surface of said gel in the first container having a cross-sectional area which exceeds a second cross-sectional area of an exposed second surface of said gel in the second container, said first and second surfaces adapted for confronting and contacting each other, the first and second containers being sized so as to be capable of telescopically mating in a vicinity of the first and second surfaces; and
- spring means exerting a resilient force for continuously maintaining said first and second containers biased towards one another over a finite range with at least a threshold force.

Mention may also be made of U.S. Pat. No. 4,451,696 (Beinhaur), the disclosure of which is incorporated herein by reference, which relates to a toolless splice enclosure, disposed within which is a sealant material. The enclosure has one or more compression buttons such that upon application of the splice enclosure to the splice, compression of the compressible buttons causes the sealant, through hydraulic pressure, to completely fill all voids which may exist, forcing the sealant around and along connector and wire. This thereby environmentally seals the splice and prohibits the contamination of the splice which may affect the electrical integrity thereof.

U.S. Pat. No. 3,757,031 (Izraeli), the disclosure of which is incorporated herein by reference, relates to a protective enclosure for spliced connections comprising a pair of universally mating members each having a male and female portion of selectively engagable latch means and a highly resilient inner liner wherein said device may be releasably locked around a wide range of joint sizes to provide a protective enclosure thereof.

I have now discovered that an improved splice case can be made employing a special spring and/or making use of a deformable surface of a part thereof.

SUMMARY OF THE INVENTION

The present invention provides a splice case for encapsulating a conductor splice, which comprises:
- a first hollow part;
- a second part, preferably hollow and preferably substantially identical to or substantially a mirror image of the first part, that can be positioned adjacent the first part such that the first and second parts together define an enclosed space; a sealing material having a cone penetration value from 100–350 ($10^{-1}$ mm) and an ultimate elongation of at least 200%, the sealing material being within the first hollow part, and preferably where hollow also within the second part; and
- a spring for forcing the first and second parts together thereby putting the sealing material under pressure, the first part and/or the second part having a deformable surface, and the spring being so shaped as to cause said surface to be deformed towards the sealing material thereby putting the sealing material under compression.

The invention also provides a splice case for encapsulating a conductor splice, which comprises:
- a first hollow part;
- a second part, preferably hollow and preferably substantially identical to or substantially a mirror image of the first part that can be positioned adjacent the first part such that the first and second parts together define an enclosed space;
- a sealing material having a cone penetration value from 100–350 ($10^{-1}$ mm) and an ultimate elongation of at least 200%, the sealing material being within the first hollow part, and preferably where hollow also within the second part; and
- a spring for forcing the first and second parts together thereby putting the sealing material under compression, the spring comprising a resilient elongate member shaped as at least three interconnected segments each segment being of re-entrant shape and comprising a first portion that can bear against a surface of the first part, preferably a deformable surface, and a second portion that can bear against a surface of the second part, preferably a deformable surface, and a third portion that interconnects the first and second portions.

The invention further provides a splice case for encapsulating a conductor splice, which comprises:
- a first hollow part;
- a second part, preferably hollow and preferably substantially identical to or substantially a mirror image of the first part, that can be positioned adjacent the first part such that the first and second parts together define an enclosed space;
- a conductor organizer comprising a comb-like member.

The first and second parts when positioned adjacent one another may abut, one may fit in telescopic fashion in the other, or they may fit together in staggered or interdigitated fashion.

A particularly advantageous splice case combines the three embodiments defined above.

DETAILED DESCRIPTION OF THE INVENTION

The splice case preferably comprises first and second hollow parts of a plastics material, each part having a deformable base. Each part is preferably substantially rectangular in plan view, optionally with tapering ends. In such a design an end portion can be cut away to open the end in question, the position of the cut determining how large an opening is provided. Thus, where the splice case is to seal a butt splice only one end of the pair of parts need be opened, whereas an in-line splice may be sealed by cutting each end from the pair parts. The size of opening provided will depend on the size of the cable (or number of dropwires) that is to enter or leave the case. Each part is preferably less deep than, preferably about half the depth its width. Its length is preferably from 2-5, especially from 3-4 times its width, its length being measured to the ends of the tapering portions where provided.

Whereas in the prior art some deformation of a splice case was known to occur (see U.S. Pat. No. 4,610,738) such deformation was regarded as disadvantageous since its effect was to allow relaxation of compressive force on an internal sealing material; springs were provided that could compress the sealing material in spite of such relaxation, and they achieved this by bodily movement of splice case halves together in telescoping fashion. The springs disclosed in that prior art could not have the function of deforming surfaces of the splice case halves in the way now proposed.

The present spring preferably bears not against edges of the parts but against deformable surfaces between them, and preferably such that pressure be exerted at more than one point. This may be achieved by the provision of some means to spread the applied force, but preferably such prefer that the spring comprises a first portion that can bear against a deformable surface of the first part, a second portion that can bear against a surface of the second part and a third portion that interconnects the first and second portions. It may be desirable for the first and second portions of the spring to bear against portions of the surfaces remote from edges of the surfaces, since at the edges the surfaces may be supported by side walls of the splice case parts. Thus, the portions of the springs may bear against central portions of the surfaces, or along or close to a center line of the surfaces, where most deformation may be achieved with the smallest force. In many cases it may be desirable that the spring, in addition to holding the parts together, causes only said deformation, or in other words it does not cause bodily movements of the parts together once they have become properly positioned.

The spring is preferably elongate and so shaped that it can be slid, laterally with respect to its length, over the two parts of the splice case such that the first portion of the spring bears against a surface of the first part, the second portion bears against a surface of the second part and the third portion (that interconnects the first and second portions) bridges a join line between the first and second parts. The spring may be shaped by gentle curving (rather than by angular bends), in which case the various portions thereof will not be so clearly differentiated by shape.

The spring preferably comprises an elongate member, such as spring steel rod or wire bent to an appropriate shape, such as a plurality of segments each one of which serves to bear against portions of the first and second surfaces of the splice case parts. Thus, the complete spring may exert a force on an internal sealing material through the surfaces at several points.

The spring (or where it comprises a bent wire or rod, an envelope thereof) may have the shape of an elongate channel, substantially u-shaped in transverse cross-section. One or more such channels may be used to hold the splice case parts together. Where two or more channels are used, they may be used end-to-end and both or all slid over a single edge of the splice case or they may face one another, being slid over opposite edges.

The surfaces of the first and second splice case parts may be designed to reduce the force required of the spring, to facilitate proper positioning of the spring, to prevent the spring slipping off once positioned, or otherwise to improve functioning of the splice case. For example, the first and second parts may be of thin-walled material, at least at the deformable surfaces. The thickness chosen will depend on the material, and for polyethylene or polypropylene, I prefer a thickness of from 1 mm–3 mm. The parts may be locally weakened for example by providing a line of weakness at the deformable surfaces. Such a line or lines of weakness may run lengthwise of the splice case and aid deformation by springs slid laterally over the longitudinal edges of the case. If desired, corrugations or other areas of expansibility or collapsibility may be provided to allow a substantially rigid portion of the deformable surface to be displaced with respect to the remainder.

The sealing material used preferably has a cone penetration value from 100 to 350 ($10^{-1}$ mm), more preferably 200–260, especially 230–250, and an ultimate elongation of at least 200%. Cone penetration may be chosen to ensure that the material is able to be deformed around the conductors to be sealed avoiding air voids, but without excessive flow or if desired excessive relaxation over time, and the ultimate elongation may be chosen to ensure that on re-entry into the splice case the material is pulled away from the conductors by the parting first and second splice case parts. Cone penetration is measured by ASTM D217-68 at 21° C. on an undisturbed sample using a standard 1:1 scale cone (cone weight 102.5 g, shaft weight 47.5 g), the penetration being measured after 5 seconds. Elongation is measured by ASTM D638-80 at 21° C. using a Type 4 die to cut the sample, and at a speed of 50 cm/minute.

Suitable sealing can be made by gelling curable polyurethane precursor materials in the presence of substantial quantities of mineral oil, a vegetable oil or a plasticizer or a mixture thereof. The amount of plasticizer may be, for example, 30–70% by weight of the total in the case of a plasticizer such as trimellitate, or 60–80% in the case of a mineral or vegetable oil. Mineral and vegetable oils may be mixed, for example in the ratio 0.7–2.4 parts by weight of mineral oil to 1 part by weight of vegetable oil. Other suitable sealing materials may be made by curing reactive silicones with non-reactive, extender, silicones. A further class of materials comprises those formed by extending triblock copolymers, such as styrene-ethylene-butylene-styrene copolymers (for example that sold under the Shell trademark Kraton) with a mineral oil. These sealing materials are disclosed in U.S. Pat. Nos. 4,634,207 (Debbaut) and 4,716,183 (Gamarra), the disclosures of which are incorporated herein by reference.

The sealing material may substantially fill the enclosed space dipped by the parts or it may serve merely to seal some part thereof that blocks what would otherwise be a leak path to the outside environment. I prefer that the sealing material contact all damagable surfaces of a substrate placed in the splice case, and the space is preferably therefore substantially filled with sealing material.

An organizer may be provided, positionable within the enclosed space defined by the first and second splice case parts. The organizer may serve simply to hold the conductors to be spliced in an orderly fashion making best use of the space available. It may however have other functions such as identification of conductors by position, or in the case of a splice case for optical fibers it may have the function of maintaining the fibers at a desired bend radius.

The organizer preferably comprises at least one comb-like member, between the teeth of which individual conductors may be laid. Such an organizer is preferably positioned adjacent an outlet of the splice case. An organizer may be present at one end of the splice case to seal a butt splice or at each end two opposite ends to seal an in-line splice, etc. The organizer may be curved (for example in plan view it may approximate an arc of a circle) such that the conductors of a cable entering the splice case may splay out over approximately a sector of a circle bound by the organizer, through which they then pass. In this way a number of conductors may be organized preferably from 4–60, preferably 10–50, especially 30–50. If desired the organizer may be capable of organizing two or more layers of side-by-side conductors, for example by the provision of comb teeth of sufficient height. A layer of material, for example a sealing material, such as the sealing material mentioned above, may be provided between each layer of conductors. Alternatively, a layer between the conductors may be a foam, for example an open- or closed-cell foam, which may have a sealing function or may serve merely to hold the conductors in place. An open-cell foam may be impregnated with a sealing material, such as that mentioned above, providing the advantage that the foam may be compressed by the springs when the parts of the splice case are brought together thereby putting the sealing material under compression. An initial layer of sealing material or foam may lie under the first layer of conductors. The organizer may be located within the first or second part of the splice case by, for example, means of an extension from a comb-like part thereof. Such extension may have a hole therethrough, through which an extension of the spring passes after passing through a surface of the part. Two or more organizers may be positioned at one or both ends of the splice case, for example fixed to respective parts thereof.

The invention is further illustrated by the following drawings, in which.

Figure 1:
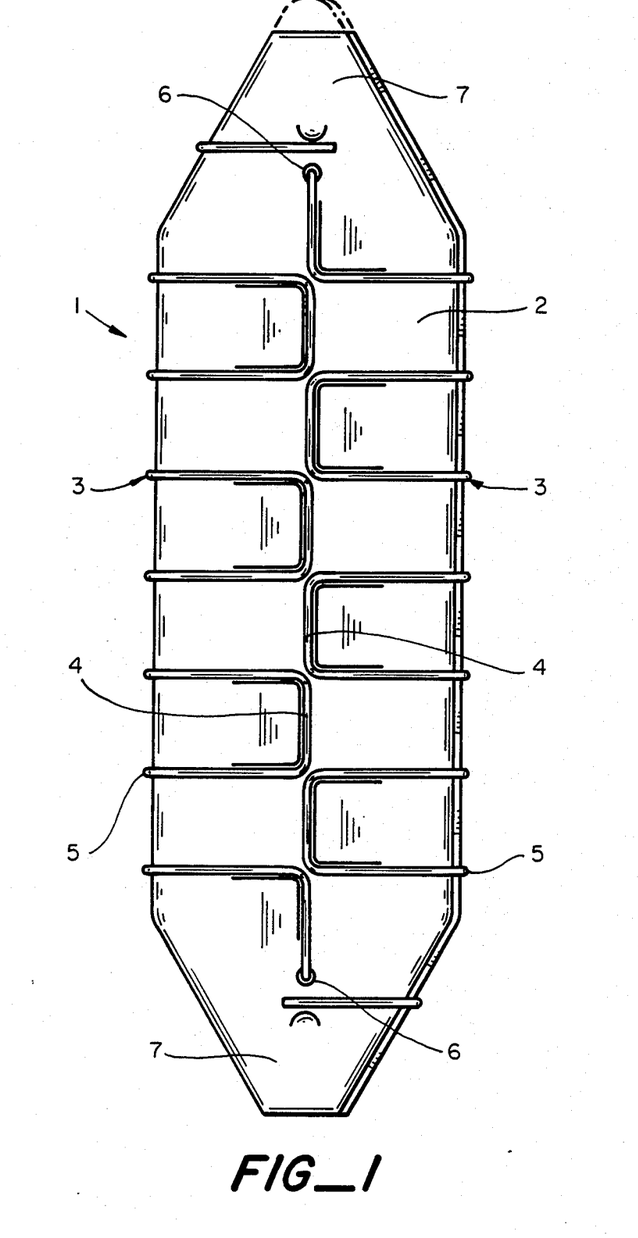
FIG. 1 is a plan view of a splice case.

FIG. 1 shows a splice case 1 in plan view, a first hollow part 2 thereof being visible. The first part 2 is held adjacent a similar, but obscured, second part below it by springs 3. First portions 4 of the springs 3 can be seen to bear against a deformable surface of the part 2. The portions 4 are connected to second portions of the spring (that bear on the hidden second part of the splice case) by third portions 5 of the springs. The springs 3 may be located in the parts of the splice case by passing into holes 6 therein. The splice case may have tapered ends 7, end portions of which may be cut away if desired to form outlets of the desired size.

Figure 2:
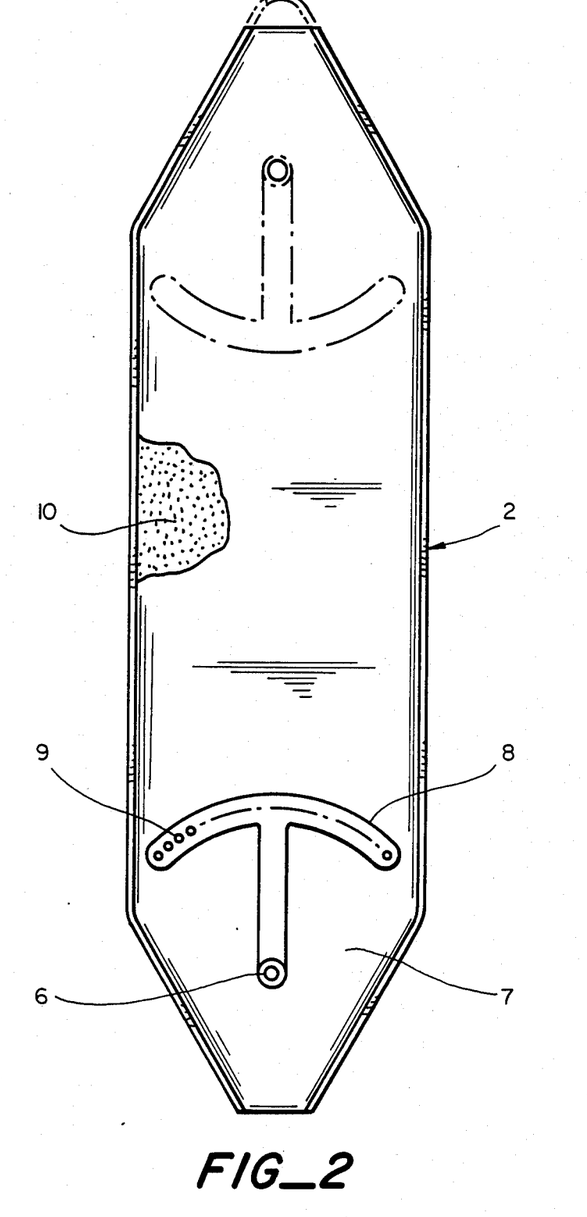
FIG. 2 is a plan view of the first part, looking into its hollow interior.

FIG. 2 is a plan view of the first part 2, looking into its hollow interior. An organizer 8 can be seen, being of comb-like design having upstanding teeth 9. If desired, teeth may be provided on both sides of an organizer base. The organizer 8 has the shape of an arc of a circle together with an extension that may be located for example by engaging a tubular extension surrounding the hole 6 or by engaging an end of the spring that passes through hole 6. The hollow part 2 may contain a sealing material 10.

Figure 3:
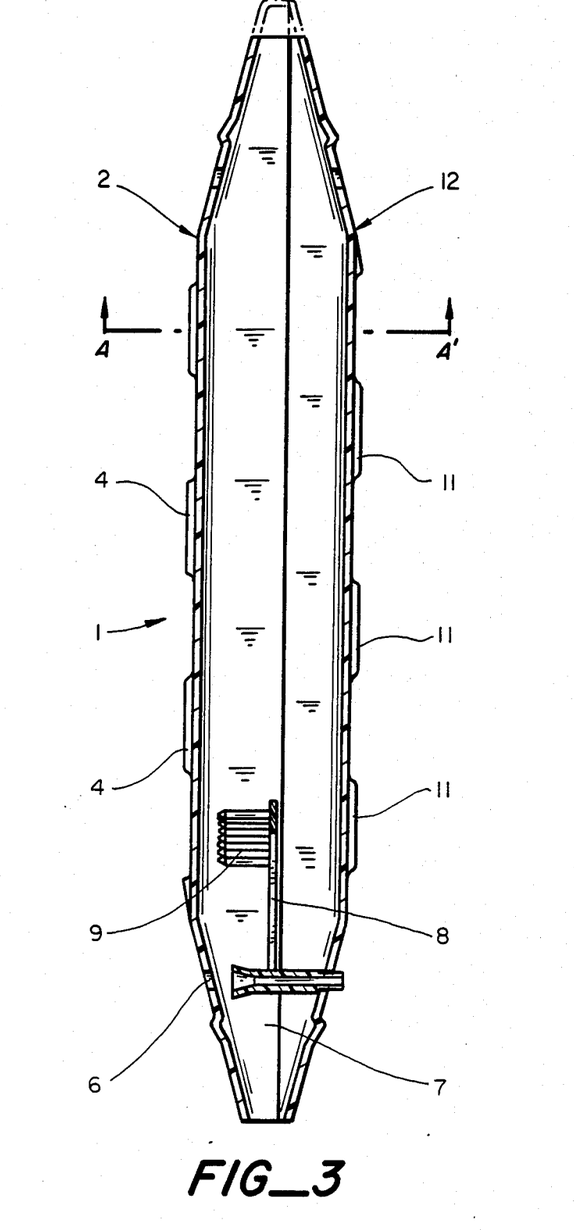
FIG. 3 is a longitudinal cross-section through the splice case.

FIG. 3 is a longitudinal cross-section through the splice case of FIG. 1. A second splice case part 12 can now be seen below first part 2. The two parts are held together and deformable surfaces thereof deformed by springs, first parts 4 and second parts 11 thereof being visible. The organizer 8 with upstanding teeth 9 can be seen.

Figure 4:
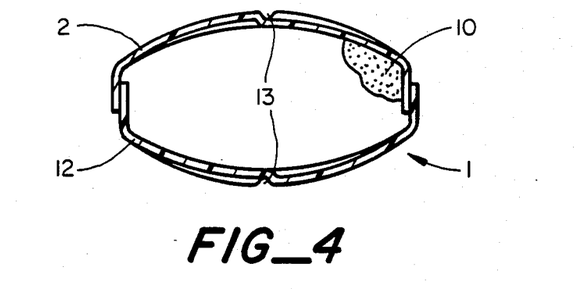
FIG. 4 is a transverse cross-section of the splice case.

FIG. 4 is a transverse cross-section taken along line A A′ of FIG. 3. Identical first and second parts 2, 12 can be seen. It is advantageous that the parts be identical since this facilitates manufacture and assembly. The two parts may be made in one piece by, for example, blow molding and then cut to separate the two parts. The top and bottom deformable surfaces can be seen to have a line, or other means, of weakness 13 to aid deformation by the springs. The line of weakness may be a recess or region of reduced thickness, optionally bordered by ridges.

Figure 5:
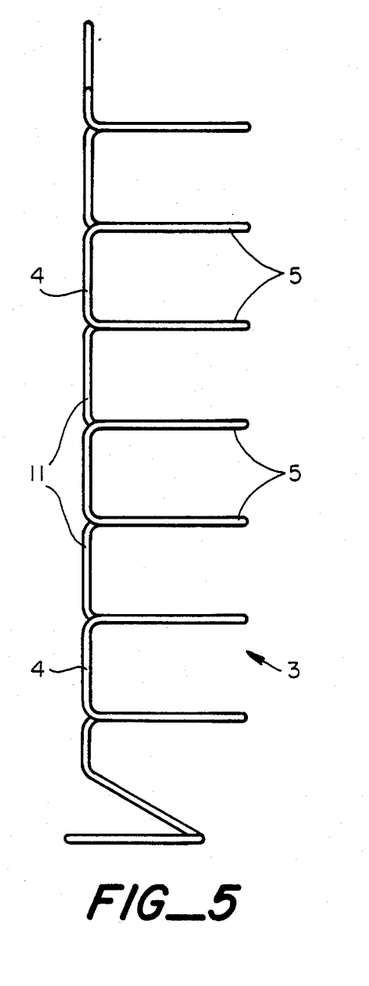
FIG. 5 is a plan view of a spring.
Figure 6:
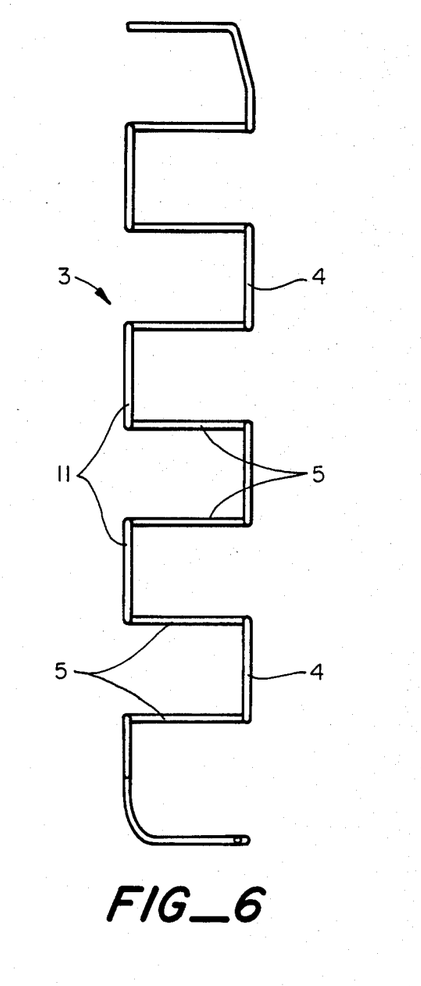
FIG. 6 is a side elevation of a spring.

A plan view of a spring is shown in FIG. 5. First portions 4 can be seen. The first portions 4 are connected to second portions, hidden below them, by third portions 5. This can be seen more clearly in FIG. 6 which is a side elevation. First portions 4 are connected to second portions 11 by third portions 5.

Figure 7:
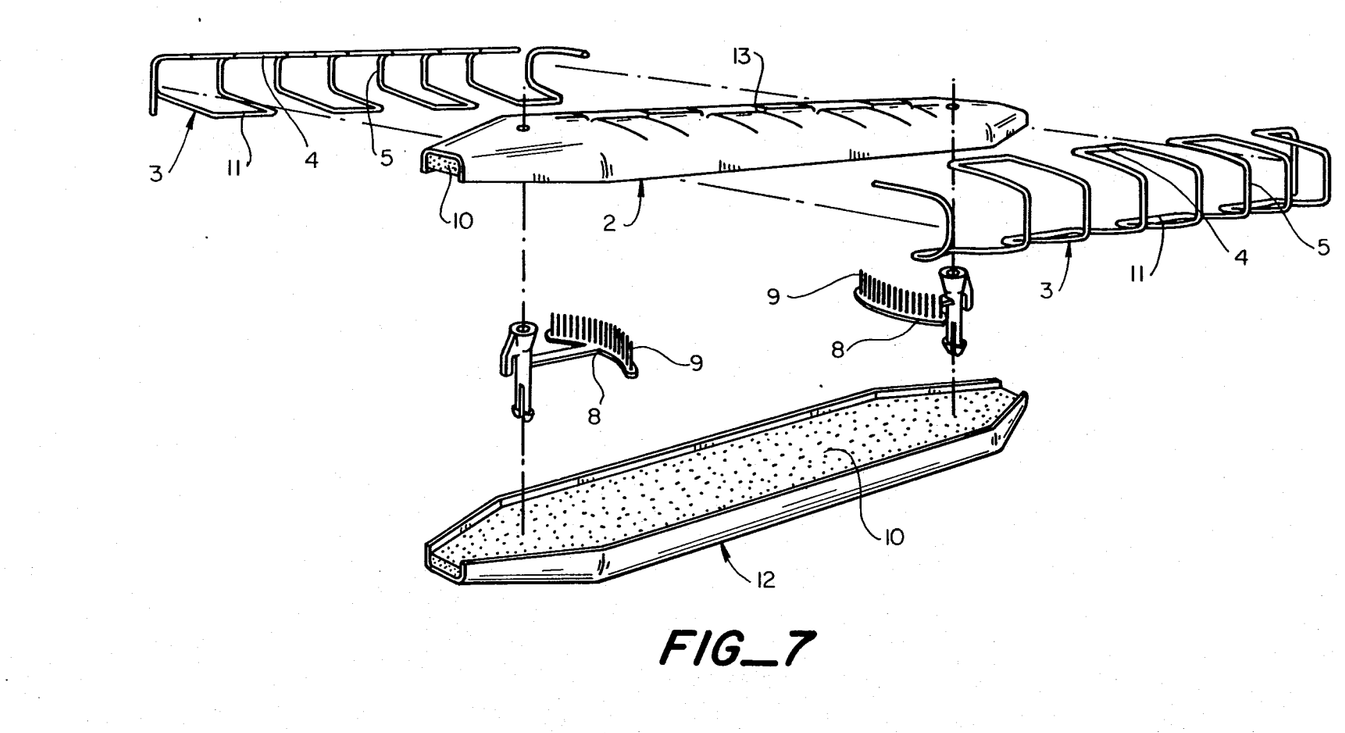
FIG. 7 is an exploded perspective view of a splice case.

FIG. 7 shows first and second parts 2, 12 of a splice case, and organizers 8 that have protruberances that can snap or otherwise fit into holes in the parts. Springs 3 can be seen that slide over the parts when they are positioned adjacent one another.

Figure 8:
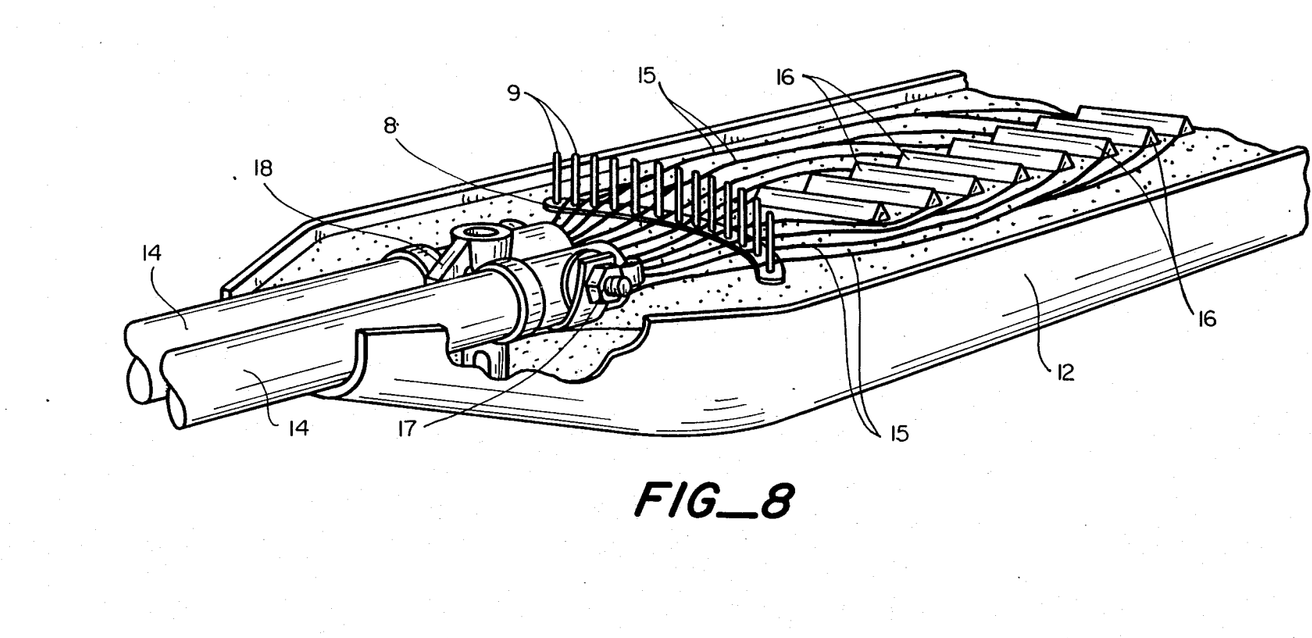
FIG. 8 is a perspective view of a part of a splice case with cables in position.

FIG. 8 shows a second part 12 being used to house a butt splice between two cables 14. The conductors 15 of the cable can be seen to be organized by the organizer 8, and splices joining the cables are organized by means 16. A cable clamp 17 is shown, optionally fixed to a part 18 of the organizer 8. This design is especially suitable for sealing a joint between two cables of about 11 pairs each. The conductors are preferably arranged in two or more layers at the organizer 8 and also if need be at the means 16 and throughout the length of the splice case. Layers of sealing material may be positioned between each "layer" of conductors.

The splice case is preferably from 15-40 cms, especially 20-35 cms long, 4-15 cms especially 5-10 cms wide and 2-6 cms especially 3-5 cms deep.

The springs may provide some mechanical strength for example impact strength, and the sealing material may contribute by providing damping under impact. For best impact strength, the path of the spring may extend over substantially all of the deformable surface of the parts, i.e. across the width and length of the splice case. Preferably the spacing between runs of a rod-like spring is less than 5 cms, preferably from 1.5-4 cms.

I claim:

1. A spice case for encapsulting a conductor splice, which comprises:
   a first hollow point;
   a second part that can be positioned adjacent to the first part such that the first and second parts together define an enclosed space;
   a sealing material having a cone penetration value from 100 top 350 ($10^{-1}$ mm) and an ultimate elongation of at least 200%, the sealing material being within the first hollow part; and
   a spring for forcing the first and second parts together thereby putting the sealing material under compression, when the spring engages the first and second parts;
   the first part and/or the second part having a deformable surface, and the spring being so shaped as to cause said surface to be deformed toward the sealing material thereby putting the sealing material under compression when the spring engages the first and second parts.

2. A splice case according to claim 1, in which the spring has the functions of:
   (a) holding the first and second parts adjacent one another; and
   (b) causing deformation of said surface.

3. A splice case according to claim 1, in which the spring comprises a plurality of segments each of which can bear against a different part of said surface thereby distributing a compressive force on the sealing material.

4. A splice case according to claim 1, in which said surface has a line of weakness facilitating said deformation.

5. A splice case according to claim 1 further including a sealing material in the second hollow part.

6. A splice case for encapsulating a conductor splice, which comprises:
   a first hollow part;
   a second part that can be positioned adjacent the first part, such that the first or second parts together define an enclosed space;
   a sealing material having a cone penetration value from 100-350 ($10^{-1}$ mm) and an ultimate elongation of at least 200%, the sealing material being within the first hollow part; and
   a spring for forcing the first and second parts together thereby putting the sealing material under compression when the spring engages the first and second parts, the spring comprising a resilient elongate member shaped as at least three interconnected segments each segment being of re-entrant shape and comprising a first portion that can bear against a surface of the first part, a second portion that can bear against a surface of the second part, and a third portion that interconnects the first and second portions.

7. A splice case according to claim 6 wherein the first part and/or the second part have a deformable surface region centrally located therein.

8. A splice case for encapsulating a conductor splice, which comprises:
   a first hollow part;
   a second part that can be positioned adjacent the first part, such that said first and second parts together define an enclosed space;
   a conductor organizer positionable within the enclosed space, the organizer comprising a comb-like member having upstanding teeth substantially perpendicular to a base to separate conductor.

9. The splice case according to claim 8 wherein the first and/or the second part have a deformable surface region centrally located therein.

10. The splice case according to claim 8 wherein the conductor organizer includes a tubular member for locating the conductive organizer within either the hollow first part or the hollow second part and the hollow first part and the hollow second part include passages therein to permit the locating and aligning of the tubular member.

11. The splice case according to claim 10 further including a sealing material within the first hollow part and/or the second part.

* * * * *